(No Model.)

A. A. McHUGH.
FARRIER'S SHOEING STAND.

No. 533,604.  Patented Feb. 5, 1895.

Witnesses.
A. Ruppert.
G. B. Towles.

Inventor:
Albert A. McHugh,
Per
Thomas P. Simpson,
Atty.

UNITED STATES PATENT OFFICE.

ALBERT A. McHUGH, OF WHEELING, WEST VIRGINIA.

FARRIER'S SHOEING-STAND.

SPECIFICATION forming part of Letters Patent No. 533,604, dated February 5, 1895.

Application filed July 18, 1894. Serial No. 517,909. (No model.)

*To all whom it may concern:*

Be it known that I, ALBERT A. McHUGH, a citizen of the United States, residing at Wheeling, in the county of Ohio and State of West Virginia, have invented certain new and useful Improvements in Farriers' Shoeing-Stands; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a farrier's shoeing-stand so that the horse's feet may be supported while the farrier sits in a convenient position to fit the shoe to the animal's hoof, drive the fastening nails thereinto, and clinch the ends of nails on the outside of the hoof.

Figure 1:
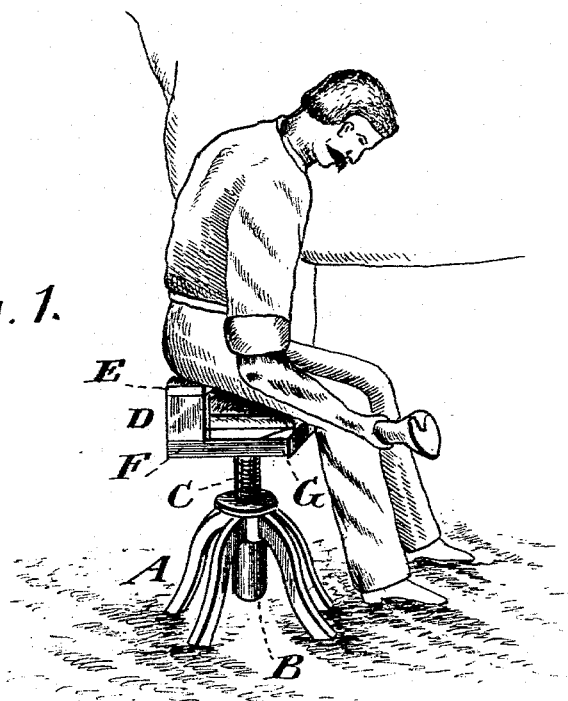
Figure 2:
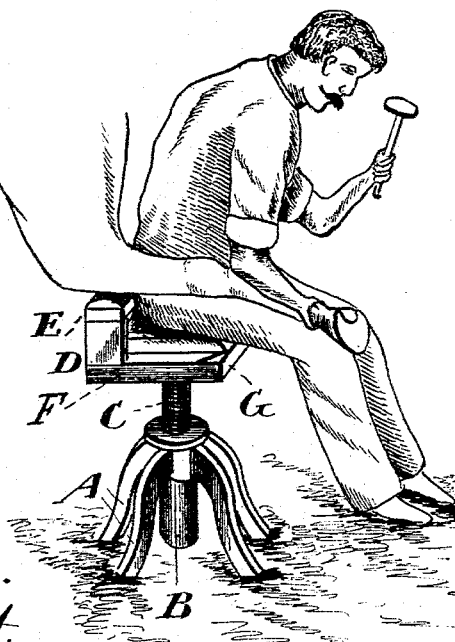

Figure 1 of the drawings is a perspective view, showing the position of the farrier, when he is shoeing the front feet, and Fig. 2, a similar view, showing his position when putting the "hind" shoes upon the animal.

In the drawings, A represents the legs of the stand, of which there may be three or more, supporting a central tube internally threaded to receive a screw C. By turning the latter in the tube B, the frame D may be raised or lowered to suit the height of the horse. On this frame is located the upper rest E, the lower rest F, and the clinch rests G on the corners of the stand.

In shoeing the front feet, the blacksmith sits upon the upper rest E while the horse's knee is supported by the lower rest F, as clearly shown in Fig. 1 of the drawings.

In shoeing the hind feet of a horse, the leg of the horse is supported by the upper rest E, while the blacksmith sits on the lower rest F, as clearly shown in Fig. 2 of the drawings.

In clinching the ends of nails on the outside of the hoof, the latter is supported on one of the corner rests G which are arranged in convenient position for that purpose and made of metal.

Having thus described all that is necessary to a full understanding of my invention, what I claim as new, and desire to protect by Letters Patent, is—

In a farrier's shoeing stand, the legs A carrying a central internally-threaded tube B, the frame D having on the under side a down screw C, the foreleg rest F, the hindleg rest E, and the clinch rests G, all arranged to enable the shoer to sit and the horse's feet to be supported when the nails are being driven and clinched, as described.

In testimony whereof I affix my signature in presence of two witnesses.

ALBERT A. McHUGH.

Witnesses:
 JOHN EIRENNACH,
 FRANK SMITH.